Sept. 24, 1957

C. S. COPELAND 2,807,459

RESILIENCE ADJUSTING MEANS FOR COIL SPRINGS

Filed Nov. 17, 1953

INVENTOR
C. S. COPELAND
BY
Maybee & Legris
ATTORNEYS

United States Patent Office 2,807,459
Patented Sept. 24, 1957

2,807,459
RESILIENCE ADJUSTING MEANS FOR COIL SPRINGS

Clayton Simpson Copeland, Toronto, Ontario, Canada

Application November 17, 1953, Serial No. 392,679

3 Claims. (Cl. 267—33)

This invention relates to means for adjusting the resilience of coil springs, and particularly to means for counteracting a loss of resilience in the individual front wheel suspension springs of an automobile.

Coil springs which are under a sustained load tend to lose their resilience and become too short. This is particularly true of the helical coil springs of the individual front wheel suspension or knee-action mechanism of automobiles. The object of this invention is to provide means in the form of lifts or spacers to be inserted between adjacent coils of a coil spring to increase the height and the effective resilience of the springs. In an automobile, this will restore the proper tension to the front wheel suspension springs, re-establishing the normal height of the front end of the automobile and correcting the camber adjustment and other part relationships.

A further object of the invention is to provide such means for increasing the efficiency of coil springs which can be installed singly or in any number required and by any competent workmen without special equipment and without the necessity for dismantling the mountings of the spring the height of which is to be increased.

A further object of the invention is to provide a modified lift or spacer which possesses a sufficient degree of resilience to impart a considerable degree of resilience as well as added height to a coil spring which is too short for its purpose.

In the accompanying drawings, in which each part is denoted by the same reference character throughout all views, Fig. 1 is a front elevation view of the right front wheel suspension of an automobile showing the device according to the invention installed in the coil spring of the suspension.

Figure 2:
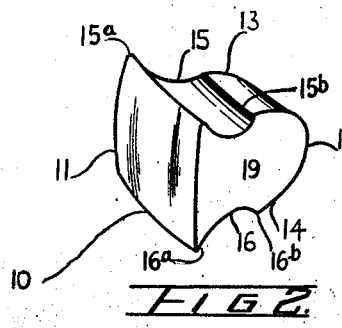
Fig. 2 is a perspective view of one of the spacers according to the invention.
Figure 3:
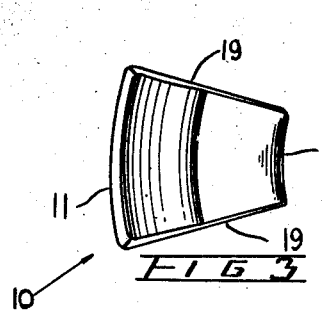
Fig. 3 is a top plan view of a spacer as shown in Fig. 2.
Figure 5:
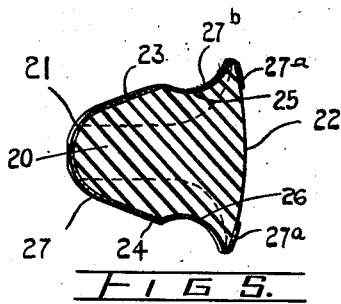
Fig. 5 is a section on the line 5—5 in Fig. 4.

As shown in Figs. 2 and 3 of the drawings the spacer according to the main form of the invention is a one-piece block or body shaped generally like a segment of an annulus having a radius slightly greater than the radius of the coils of a spring for an automobile front wheel suspension mechanism. The block has a rectangular outer portion or outer end face 11 and a blunt inner portion or inner end 12, which is relatively thin with respect to the spacing of the adjacent turns of the spring to facilitate insertion of the wedge-shaped block between adjacent turns of the spring by pressure on the outer end.

The upper and lower tapering faces 13 and 14 each includes a transversely disposed arcuate and rounded groove 15 or 16 respectively, the grooves 15 and 16 being in vertical alignment with each other and being generally concentric with the inner and outer ends of the block. The radius of the grooves is substantially the same as the radius of the coils of the spring whereby when the block is positioned between adjacent convolutions of the spring said turns are fittingly seated in the grooves and are embraced by the sides of the said grooves, the thickness of the block between the bottoms of the grooves being such that the normal spacing of the adjacent turns of the spring is restored and the pressure of the turns of the spring in the grooves of the block prevents accidental removal of the block.

The grooves 15 and 16 provide retaining shoulders 15a and 16a at the sides of the grooves nearer the outer end 11 and retaining shoulders 15b and 16b at the sides of the grooves nearer the inner end 12. The depth of the body at this inner shoulder is less than its depth at the outer shoulder, and for automobile front wheel suspension springs it is desirably about 1 1/16 inches.

As shown, the side faces 19 of the spacer 10 are preferably tapered to approach each other toward the nose 12 and lie in planes radially disposed with respect to the helical spring when the spacer is installed. This configuration is desirable to assist in inserting the spacers and also avoids excess weight and improves the appearance of the article.

Figure 1:
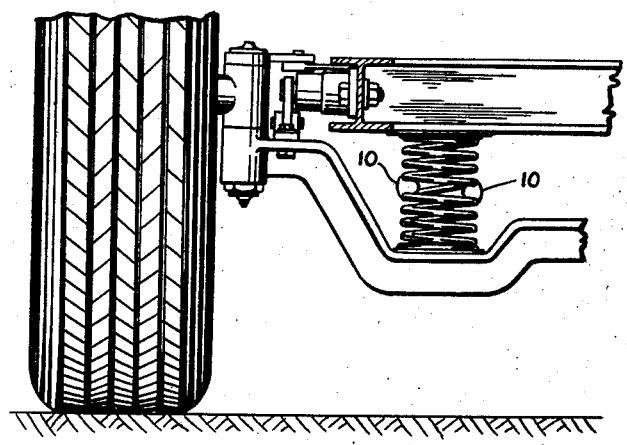

To install the spacers in the front wheel suspension springs of an automobile, one side of the front end of the car is raised by a bumper jack and a tool in the form of a flat steel bar of width equal to the height of the spacers at the retaining grooves 15 and 16—as already stated about 1 1/16 inches—is inserted, with the flat faces horizontal, between two adjacent turns near the middle of the spring. The tool is then twisted through 90° around its longitudinal axis to dispose the flat faces vertically and thus to force the adjacent turns apart by the aforesaid distance. Two spacers are then inserted, one at each side of the tool and with one of the side surfaces 19 of each against the tool, until the grooves 15 and 16 are positioned to receive portions of the adjacent turns selected. The outer shoulders 15a and 16a act as stops to prevent the spacers from being inserted too far; this is why the depth here is made greater than at the inner shoulders 15b and 16b. Before removing the tool, the two spacers are slid or tapped apart until they lie opposite each other, 180° apart on the coils, as shown in Fig. 1. The tool is then withdrawn from the first spring and the whole operation repeated on the other side of the car.

One spacer, or more than two, may of course be used as required to restore the proper height, and where the two springs have different degrees of resiliency, the number of spacers may be varied as between the springs so as to eliminate tilt in the front end of the car.

Figure 4:
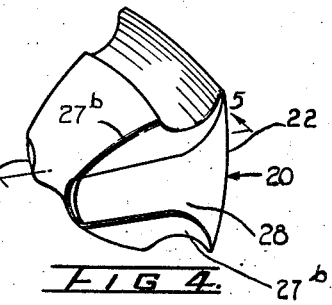
Fig. 4 is a perspective view of a modified form of spacer according to the invention.

The modified form of spacer, having a metal clad resilient body, is installed in the same manner as the main form of the invention, and also has the same general shape. Its resilience is provided by a resilient body 20 of rubber or rubber-like material. From the top and bottom edges of the rectangular outer end face 21 to the rounded inner end 22, the upper and lower tapering faces 23 and 24 (including the surfaces of the grooves 25 and 26) are covered or clad with a conformingly shaped covering sheet 27 of metal. The metal cover 27 has end flanges 27a, engaging the top and bottom edges of the end face 21, and side flanges 27b overlapping edge portions of the side faces 28. Preferably the width of the cover 27 at the inner end 22 of the body may be less than that of the inner end of the body 20 as shown in Fig. 4, to increase the flexibility of the cover at that location. If under repeated flexion, a fracture of the cover happens to occur at the nose, no disadvantage results.

The foregoing description sets forth the best mode contemplated by the inventor of carrying out his invention, but the following claims are intended to cover all useful changes and modifications of the said mode which are within the scope of the invention.

What I claim as my invention is:

1. A spacer for inserting between adjacent turns of a helical spring comprising a body of resilient material having an outer end, an inner end, and upper and lower faces tapering toward each other from the outer to the inner end and having transversely disposed arcuate grooves in vertical alignment with each other to receive fittingly parts of successive turns of the spring, each groove having its convex side near the outer end, and a covering sheet of relatively hard rigid material over both the upper and lower faces and continued over the inner end, the covering sheet including flanges partially overlapping the side faces of the body.

2. A sag compensator for use with a coil spring of an automobile front wheel suspension mechanism comprising, a one-piece block in the shape of a segment of an annulus having an outer portion on a radius slightly larger than the outside radius of the convolutions of a coil spring with which it is adapted to be used and having a small length as compared to the length of the convolutions of the coil spring, said block having an inner portion of less thickness than the outer portion whereby the opposite faces diverge from the inner portion to form a wedge shape, said opposite faces merging at the inner portion with a rounded inner face for facilitating insertion of the block between adjacent convolutions of the spring to be adjusted by pressure on the outer portion as by a hammer blow, and arcuate grooves in said opposite faces with a side of each groove spaced only slightly from the outer portion of the block, said arcuate grooves being concentric with the inner and outer portions of the block and on a radius substantially corresponding to the radius of the coils of the spring whereby when the block is positioned between adjacent convolutions of the spring said convolutions seat in the grooves in the opposite faces of the block and are embraced by the sides of said grooves, the thickness of the block between the bottoms of the grooves being such that tension and position are restored to the spring and the pressure of the spring convolutions in the grooves of the block prevents accidental removal thereof.

3. A spacer for inserting between adjacent turns of a coil spring of an automobile front wheel suspension mechanism comprising, a one-piece block shaped generally like a segment of an annulus and having an outer end and a blunt inner end of less thickness than the outer end whereby the upper and lower faces diverge from the inner end to form a wedge-shape, the inner end being relatively thin with respect to the spacing of adjacent turns of the spring to facilitate insertion of the block between the adjacent turns by pressure on the outer end as by a hammer blow, and arcuate grooves transversely disposed in the said upper and lower faces, said arcuate grooves being in vertical alignment with each other and being generally concentric with the inner and outer ends of the block, the radius of the grooves being substantially the same as the radius of the coils of the spring whereby when the block is positioned between adjacent convolutions of the spring said turns are fittingly seated in the grooves and are embraced by the sides of the said grooves, the thickness of the block between the bottoms of the grooves being such that the normal spacing of the adjacent turns of the spring is restored and the pressure of the turns of the spring in the grooves of the block prevents accidental removal of the block.

References Cited in the file of this patent

UNITED STATES PATENTS

| | | |
|---|---|---|
| 2,230,340 | Shreffler | Feb. 4, 1941 |
| 2,252,789 | Van Dorn | Aug. 19, 1941 |
| 2,673,084 | Blythe | Mar. 23, 1954 |

FOREIGN PATENTS

| | | |
|---|---|---|
| 503,341 | Great Britain | Apr. 5, 1939 |